(12) United States Patent
Freitag

(10) Patent No.: US 11,092,358 B1
(45) Date of Patent: Aug. 17, 2021

(54) ELECTRICAL HEATING DEVICE

(71) Applicant: Eberspächer catem GmbH & Co. KG, Herxheim (DE)

(72) Inventor: Rüdiger Freitag, Landau (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 0 days.

(21) Appl. No.: 16/791,465

(22) Filed: Feb. 14, 2020

(51) Int. Cl.
*F24H 9/18* (2006.01)
*H05B 3/46* (2006.01)
*B60H 1/22* (2006.01)

(52) U.S. Cl.
CPC ......... *F24H 9/1827* (2013.01); *B60H 1/2215* (2013.01); *H05B 3/46* (2013.01); *H05B 2203/02* (2013.01)

(58) Field of Classification Search
None
See application file for complete search history.

(56) References Cited

U.S. PATENT DOCUMENTS

| | | | | |
|---|---|---|---|---|
| 1,671,677 A * | 5/1928 | Keeton | ............... | F24H 1/142 392/489 |
| 1,696,758 A * | 12/1928 | Galdi | .................. | F24H 1/20 392/482 |
| 1,985,830 A * | 12/1934 | Hynes | ................. | F24H 1/102 392/492 |
| 2,640,138 A * | 5/1953 | Merritt | ............... | F02N 19/10 392/489 |
| 2,775,683 A * | 12/1956 | Kleist | ................ | F28D 7/106 392/398 |
| 3,228,527 A * | 1/1966 | McPherson | ....... | B01D 17/045 210/307 |
| 3,235,084 A * | 2/1966 | King | .................. | B01D 35/18 210/149 |
| 3,835,294 A * | 9/1974 | Krohn | ................ | F24H 1/121 392/484 |
| 4,147,927 A * | 4/1979 | Pirotte | ............. | A45D 1/28 219/541 |
| 4,177,375 A * | 12/1979 | Meixner | ........... | H05B 3/141 219/439 |

(Continued)

FOREIGN PATENT DOCUMENTS

| | | |
|---|---|---|
| CN | 102444985 | 5/2012 |
| WO | 2016180638 | 11/2016 |

*Primary Examiner* — Thor S Campbell
(74) *Attorney, Agent, or Firm* — Boyle Fredrickson S.C.

(57) ABSTRACT

An electrical heating device for a motor vehicle has a housing which encloses a circulation chamber, The housing has inlet and outlet openings for a medium to be heated which communicate with the circulation chamber. An electrically insulated PTC element projects into the circulation chamber and is electrically conductively connected to conductor elements leading to connections of different polarity, The housing forms a connection chamber in which the connections to the PTC element are electrically connected. The connection chamber and the circulation chamber are separated from one another and are sealed against each other. A flat tube is curved in a U-shape for a good heat discharge. The flat tube has opposite legs which each contain at least one PCT element and against which rests at least one heat-emitting element which is exposed in the circulation chamber.

8 Claims, 1 Drawing Sheet

(56) References Cited

U.S. PATENT DOCUMENTS

| | | | | |
|---|---|---|---|---|
| 4,286,140 A * | 8/1981 | Dewulf | F24H 9/2014; 165/156 |
| 4,371,778 A * | 2/1983 | Meixner | F23K 5/20; 392/480 |
| 4,387,691 A * | 6/1983 | Marcoux | B01D 35/18; 123/557 |
| 4,437,986 A * | 3/1984 | Hutchins | B01D 17/045; 210/130 |
| 4,447,706 A * | 5/1984 | Eder | F23D 11/44; 123/549 |
| 4,465,922 A * | 8/1984 | Kolibas | F24H 1/121; 165/156 |
| 4,477,715 A * | 10/1984 | Bell | H05B 3/141; 219/205 |
| 4,529,866 A * | 7/1985 | Leary | F02M 31/125; 219/205 |
| 4,563,571 A * | 1/1986 | Koga | H05B 3/42; 219/543 |
| 4,571,481 A * | 2/1986 | Leary | F24H 1/103; 219/205 |
| 4,585,924 A * | 4/1986 | Pakula | F02M 37/30; 219/205 |
| 4,603,244 A * | 7/1986 | Genz | F02M 31/16; 219/205 |
| 4,713,524 A * | 12/1987 | Leo | F02M 31/18; 392/488 |
| 4,808,793 A * | 2/1989 | Hurko | F24H 1/102; 392/480 |
| 4,861,966 A * | 8/1989 | Matthiesen | B01D 35/18; 219/205 |
| 4,997,555 A * | 3/1991 | Church | B01D 21/34; 210/136 |
| 5,438,642 A * | 8/1995 | Posen | F24H 1/102; 122/19.1 |
| 5,547,572 A * | 8/1996 | Stone | B01D 17/0214; 210/232 |
| 6,289,177 B1 * | 9/2001 | Finger | F24H 1/102; 392/447 |
| 6,493,508 B1 * | 12/2002 | Roesgen | F02M 37/30; 392/485 |
| 7,248,792 B2 * | 7/2007 | Mihara | A61C 1/0069; 392/465 |
| 8,180,207 B2 * | 5/2012 | Shirai | F24H 9/0015; 392/491 |
| 8,637,796 B2 * | 1/2014 | Bohlender | B60H 1/2221; 219/553 |
| 8,946,599 B2 | 2/2015 | Niederer et al. | |
| 9,528,722 B1 * | 12/2016 | Hansen | H05B 3/06 |
| 9,927,147 B2 * | 3/2018 | Wu | H05B 3/141 |
| 10,051,991 B2 * | 8/2018 | Blanc | B23P 15/00 |
| 10,233,874 B2 * | 3/2019 | Smith | B01D 35/005 |
| 10,485,059 B2 * | 11/2019 | Bohlender | H05B 3/50 |
| 2006/0098964 A1 * | 5/2006 | Haubold | F02M 31/125; 392/447 |
| 2012/0085742 A1 | 4/2012 | Niederer et al. | |
| 2014/0086566 A1 * | 3/2014 | Waechter | F24H 1/009; 392/479 |

* cited by examiner

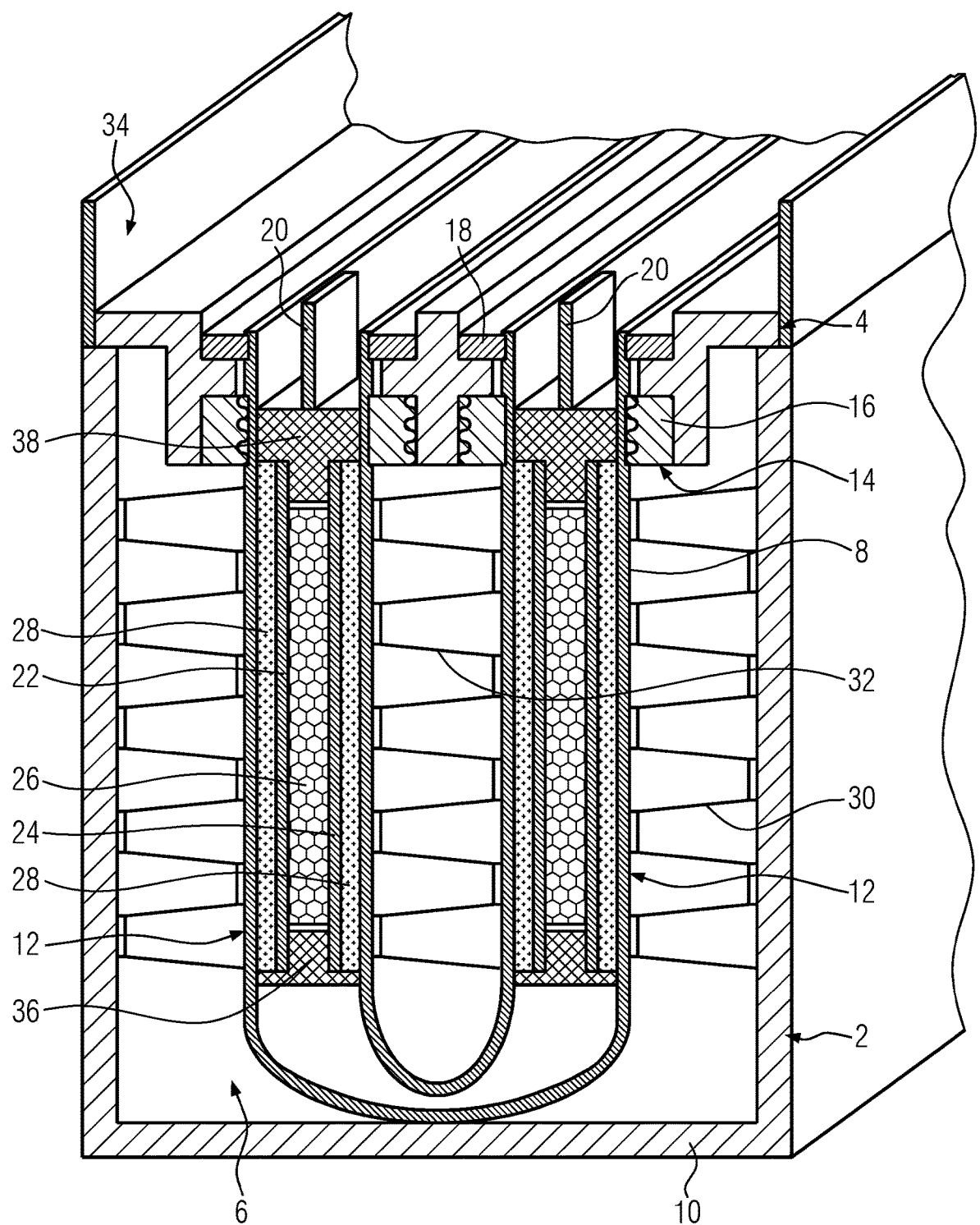

ELECTRICAL HEATING DEVICE

BACKGROUND OF THE INVENTION

1. Field of the Invention

The present invention refers to an electrical heating device for a motor vehicle and, more specifically, relates to an electrical hating device having a PTC element which projects electrically insulated into a circulation chamber of a housing and which is electrically conductively connected to conductor elements which lead to connections of different polarity.

2. Background of the Invention

Such an electrical heating device is known for example from EP 1 872 986 A1. With this state of the art, a PTC heating element comprising at least one PTC element and contact elements on both sides, surrounded by insulation on the outside, is inserted into a radiator formed of metal and exposed within a circulation chamber. The PTC heating element is braced inside the pocket formed by the radiator by a wedge element, so that the layers of the heat-generating unit consisting of the PTC element and the two contact plates as well as the outer insulating layers lie against each other under pre-stress and good heat transfer is ensured between the unit and the inner surfaces of the radiator.

In the case of a PTC element, the efficiency of the heat-generating unit depends to a large extent on good heat dissipation of the heat generated by the unit.

An electrical heating device of the same species is known from EP 3 101 364 A1. In this electrical heating device, an insulating layer covering the PTC heating element on the outside is exposed within a frame formed by the housing of the PTC heating element. The heat generated by the heat-generating unit is decoupled directly via the surface of the insulating layer to the medium to be heated.

A further development is proposed in EP 3 334 242 A1, which discloses a PTC heating element which is kept fluid-tight by a plug connection in a partition wall which separates a circulation chamber through which the medium to be heated flows from a connection chamber receiving the electrical connections of the PTC heating element.

The solutions discussed above show the efforts of experts to provide an electrical heating device with a good efficiency. However, there is room for improvement.

SUMMARY OF THE INVENTION

This present invention is intended to provide an electrical heating device which meets the above requirements in an improved manner.

The present invention proposes an electrical heating device which has a circulation chamber enclosed by a housing. The housing can be made of metal or plastic. The circulation chamber is equipped with inlet and outlet openings for the medium to be heated. These openings are usually formed by connecting pieces for hoses or tubes. In any case, the openings on the outside of the housing are usually designed in such a way that a hose for the liquid medium to be heated can be connected to the inlet and outlet openings. The electrical heating device has a PTC element. It is understood that, typically, a plurality of PTC elements are provided as part of the electrical heating device to achieve a significant thermal output of 1000 watts or more. The PTC element is electrically isolated from the circulation chamber. Accordingly, the medium to be heated does not come into contact with the power current flowing to the PTC element.

The electrical heating device is particularly suitable for high-voltage operation, especially for operation in electrically driven motor vehicles. The housing also forms a connection chamber in which connections to the PTC element intended to energize the PTC element with different polarity can be made. The connection chamber and the circulation chamber are separated from each other and sealed against each other. This can be done by, for example, using the partition wall already mentioned above. Usually, only the connections, usually in the form of male contact tongues, are exposed in the connection chamber. The connections can be formed in one piece by contact plates, which lie against the PTC element as conducting paths on opposite sides and energize it. However, the contact tongues or the connections can also be formed by separate elements which are electrically conductively connected to the contact plates.

A U-shaped flat tube is provided in the circulation chamber, the opposite legs of which are each provided with at least one PTC element. The flat tube accommodates these PTC elements and seals these PTC elements as well as the conductor elements leading to them in such a way that the fluid in the circulation chamber does not reach the PTC element and the conductor elements. At least one heat-emitting element, exposed in the circulation chamber, rests on the flat tube. The heat-emitting element usually forms at least one, regularly several ribs, which are exposed in the circulation chamber and surrounded by the fluid to be heated. The heat-emitting element causes a considerable increase in the surface area compared to the outer circumferential area of the flat tube, which is also regularly exposed in the circulation chamber.

This design ensures that the PTC element and the electrically adjacent conductor elements are reliably sealed against the circulation chamber by the U-shaped bent flat tube and are accommodated in it. The heat-emitting element on the outside of the flat tube leads to an improved discharge of the heat generated by the PTC element. The flat tube is preferably a tube with a substantially rectangular cross-sectional area, the tube usually having main side faces which lie against the main side faces of the PTC element with insulation interposed. The main side surfaces are those surfaces, for example of the PTC element, which face each other and form the largest surface of the PTC element. The two main side surfaces of a PTC element are connected to each other by considerably smaller end surfaces. The smaller end faces should be convexly curved on the outside, preferably semi-circular in cross-section. In the case of a round or oval PTC element, these end faces are formed by the circumferential surface. Usually, however, the PTC element is a cuboid so that the PTC element has four end faces.

A metal tube is usually used as a U-shaped bent tube, although it is also possible to use a ceramic tube or a plastic tube. In the case of a metal tube, there is an insulating layer between the inner circumferential surface of the tube and the PTC element or the conductor element assigned to the PTC element. The insulating layer is formed, for example, from a ceramic plate, such as an aluminum oxide plate. This creates a direct electrical contact between the layers of the heat-generating unit or cell consisting of the PTC element and the two conductor elements and the inner circumferential surface of the U-shaped tube.

The U-shaped bent tube usually has two parallel legs, each of which is regularly equipped with at least one PTC element, and a base connecting the two legs. This base is close to or preferably touches the bottom of the circulation chamber. The base can be curved. By elastic deformation of the base against the bottom of the circulation chamber, the base can exert an elastic pre-stressing force which seals the U-shaped tube in the region of a partition wall or forces it into or holds it in a seal. For example, the pre-stress can compress elastic sealing elements to achieve a good seal between the outer circumferential surface and/or the end face in an end area of the flat tube.

The heat-emitting element(s) can be soldered to the outer circumferential surface of the flat tube or otherwise connected in a material-locking manner. However, a design in which the heat-emitting element is pre-stressed against the outer circumferential surface of the flat tube is preferred. The heat-emitting element usually rests against at least one leg of the flat tube in such a way that the flat tube is biased against the PTC element. Accordingly, the heat-emitting element also causes the PTC element to be braced against the inner circumferential surface of the flat tube by pre-stressing it against the outside of the flat tube. This ensures good heat extraction to the outer surface of the flat tube. If a contact plate or insulating layer is also provided between the inner circumferential surface of the flat tube and the PTC element, a solid electrical contact is also established between the contact plate and the PTC element by means of the pressure through the insulating layer. Thus, the system of the heat-emitting element under pre-stress enables both good electrical contact within the flat tube and improved heat dissipation to the outside.

According to another embodiment of the present invention, the heat-emitting element is a uniform spring element which is pre-stressed against both legs of the flat tube. This heat-emitting element is usually placed against the outer main side surfaces of the U-shaped tube. The heat-emitting element can completely surround the U-shaped bent flat tube. Accordingly, the U-shaped bent flat tube can be provided within the heat-emitting element.

Preferably, the heat-emitting element is supported to generate the pre-stress between the outer surface of one leg of the U-shaped flat tube and the inner wall of the housing assigned to this leg. The heat-emitting element is usually clamped between these two contact surfaces under pre-stress. The pre-stress force acting on the U-shaped bent tube is then usually supported and held by the opposite side walls of the housing forming the circulation chamber. This allows a relatively high elastic pre-stress force to be applied to the U-shaped flat tube.

With a view to a solid transfer with simultaneously good heat transfer between the two legs of the U-shaped flat tube, it is proposed, in accordance with a further development of the present invention, to arrange a heat-emitting spacer element between these two legs. This spacer element usually rests on the opposite main side surfaces of the flat tube. The spacer element can itself be elastically pre-stressed by stress from the outside. Accordingly, the spacer element produces an elastic counterforce to the pre-stress force acting from the outside against the flat tube. The spacer element between the two legs of the flat tube can also be provided as an essentially stiff element, which hardly or only slightly gives way under normal stress by the pre-stress force acting from the outside. This means that the spring forces acting from the outside against the U-shaped flat tube can be precisely dimensioned and the spring force adjusted without setting amounts or internal compensating movements. In addition, the flat tube together with the spacer element can be regarded as a rigid unit which does not deform inwards. Accordingly, the distances between the free ends of the flat tube are specified relatively precisely so that they can be aligned with openings in the partition wall and reliably sealed therein.

The middle spacer element can be glued or soldered to the flat tube. Thus, for example, a transportable unit can be created which can be handled on its own, which has to be handled as a unit during the installation of the electrical heating device and only has to be pre-stressed by the external heat-emitting element(s).

The flat tube can also be connected to the heat-emitting element(s) adjacent to the outside, for example by gluing or soldering. With this design, the heat-emitting element does not necessarily have to lie against the U-shaped bent flat tube under pre-stress. Due to the lack of external pre-stress force, it is preferable to glue the layers of the layer structure within the flat tube together, especially here, but also in the other designs of the invention. The unit consisting of the PTC element, the adjacent conductor elements and the insulation is glued together. This unit is also preferably glued to the inner surface of the flat tube. Bonding should be carried out using an adhesive with good thermal conductivity, such as an adhesive to which heat-conducting particles, such as ceramic particles, have been added. However, another adhesives may be provided between the conductor element and the PTC element. This makes it possible to apply and glue the conductor element against the PTC element at high pressure. In this case, the roughness peaks of the PTC element are preferably applied to the conductor element. Instead of ceramic particles, thermally conductive particles may also be contained in the adhesive provided between these phase boundaries.

In order to position the PTC element and the adjacent conductor elements, a position frame is proposed that surrounds the PTC element circumferentially and at least joins the conductor elements and, if necessary, the insulation. All elements can be connected to the position frame, e.g. glued and/or positively connected to it.

BRIEF DESCRIPTION OF THE DRAWING

Further details of the present invention can be found in the following description of an embodiment in connection with the single FIGURE which is a schematic cross-sectional view of an electrical heating device.

DETAILED DESCRIPTION

The embodiment shown in the FIGURE has a multi-part case, of which the FIGURE essentially shows a tub-shaped case base 2. This housing base 2 is equipped with a partition wall 4 which covers the top of a circulation chamber 6 circumferentially surrounded by the housing base 2 and which is not shown here but can be designed according to EP 1 872 986 A1, for example. In the circulation chamber 6, a U-shaped flat tube 8 is accommodated, the base 10 of which touches the base of the housing base 2, so that opposing legs 12 of the flat tube are urged in the direction of a seal receptacle 14, which is formed as part of the partition wall 4. In the seal receptacle 14, labyrinth seals 16 are accommodated, which are in sealing contact with the outer circumferential surface of the flat tube 8.

The flat tube 8 is guided through the seal receptacle 14. The free ends of the flat tube 8 are flush with a sealing plate 18, which is connected to the seal receptacle 14 and, by gluing to the free ends of the flat tube 8, creates a further seal to the circulation chamber 6. This sealing plate 18 can, for example, be formed by a casting compound which is filled into a specially designed receptacle of the partition wall 4 in order to seal the free ends of the flat tube 8. Alternatively, a prefabricated plate can be used and glued sealingly to the partition 4 and/or the free ends of the flat tube 8. This sealing plate 18 is projected by male contact elements 20, which lead into the interior of the flat tube 8 and serve as contact tongues for the electrical plug-in contact. The contact elements 20 are electrically connected to conductor elements 22, 24, which are directly and thus electrically contacted on the main side surfaces of a PTC element marked with reference numeral 26. An insulating layer 28 in the form of aluminum oxide plates is provided on the outside of the conductor sections 22, 24.

Between the inner circumferential surface of the lower housing part 2 and the outer surfaces of the flat tube 8 there is an external heat-emitting element 30 which surrounds the flat tube 8 circumferentially and is elastically supported on the one hand on the inner wall of the lower housing part 2 and on the other hand on the outer surface of the flat tube 8. Between the legs 12 of the flat tube 8 there is a heat-emitting spacer element 32, which is formed from a basically incompressible sheet. Elements 30, 32 are made of meandering bent sheet material. The shaping and selection of the material for the spacer element 32 is carried out in such a way that it is relatively unyielding and rigid, whereas the heat-emitting element 30 also has elastic properties by shaping or selection of the material, so that the flat tube 8 rests from the outside against both the outer heat-emitting element 30 and the inner heat-emitting spacer element under pre-stress by the heat-emitting element 30.

The FIGURE does not completely show the connection chamber provided on the opposite side of the circulation chamber 6 and indicated with reference numeral 34. The connection chamber can be designed as described in EP 1 872 986 A1 or EP 3 101 364 A1. The connection chamber 34 can only electrically connect different flat tubes 8 provided next to or behind each other in the circulation chamber 6 and group them into circuits and/or have a control for the power current.

In the embodiment shown, two contact elements 20 are provided for each PTC element 26 in the direction of view as shown in the FIGURE, so that these are each connected separately. A position frame which forms at least one frame receptacle in which the PTC element 26 is accommodated and against which the insulating layer 28 is applied on the outside is marked with a reference numeral 36. The position frame 36 obviously forms a plug 38, which is placed on the end of the free end of the flat tube 8 and which seals this free end of the flat tube 8.

Each position frame 36 holds two contact elements 20 each, so that these are exposed at a distance from the inner circumferential surfaces of the flat tube 8 in the connection chamber 34.

I claim:

1. An electrical heating device for a motor vehicle, comprising:
   a housing which encloses a circulation chamber for a medium to be heated,
   a PTC element which projects in an electrically insulated manner into the circulation chamber and which is electrically conductively connected to conductor elements that lead to connections of different polarity,
   wherein the housing forms a connection chamber in which the connections to the PTC element are electrically connected, the connection chamber and the circulation chamber being separated from one another and sealed against each one another, and further comprising
   a flat tube which has opposed main side surfaces that are connected to one another by end surfaces that are smaller than the main side surfaces, wherein the flat tube is bent in a U-shape so to have opposite legs which each accommodate at least one PCT element and against which rests at least one heat-emitting element, which is exposed in the circulation chamber.

2. The electrical heating device according to claim 1, wherein the heat-emitting element rests under pre-stress against the legs of the flat tube in such a way that the flat tube rests under pre-stress against the PCT element.

3. The electrical heating device according to claim 2, wherein the heat-emitting element is a uniform spring element which is applied under pre-stress against both legs of the flat tube.

4. The electrical heating device according to claim 2, wherein, in order to generate the pre-stress, at least one of the heat-emitting elements is clamped between an outer surface of the respective legs of the flat tube and an associated inner wall of the housing.

5. The electrical heating device according to claim 4, wherein a heat-emitting spacer element is arranged between the legs of the flat tube to space the two legs apart.

6. The electrical heating device according to claim 4, wherein the flat tube and the at least one heat-emitting element are joined to a pre-assembled unit.

7. The electrical heating device according to claim 1, wherein a partition wall is formed between the circulation chamber and the connection chamber, and wherein free ends of the flat tube are accommodated in the partition wall in a sealed manner.

8. The electrical heating device according to claim 1, wherein the PTC element, a position frame circumferentially surrounding the PTC element, the two conductor elements, and an insulation provided between the PTC element and the inner surface of the flat tube are accommodated as a pre-assembled structural unit in the flat tube.

\* \* \* \* \*